United States Patent [19]

Einiger

[11] Patent Number: 5,122,042
[45] Date of Patent: Jun. 16, 1992

[54] WINDSHIELD REPAIR APPARATUS

[76] Inventor: Kenneth M. Einiger, 1073 Twin Branch La., Ft. Lauderdale, Fla. 33326

[21] Appl. No.: 654,098

[22] Filed: Jan. 25, 1991

[51] Int. Cl.⁵ .............................................. B32B 35/00
[52] U.S. Cl. ....................................... 425/12; 156/94; 264/36; 425/13
[58] Field of Search .............. 65/28; 156/94, 285, 156/286, 382; 264/36; 425/11, 12, 13

[56] References Cited

U.S. PATENT DOCUMENTS

| | | | |
|---|---|---|---|
| 3,993,520 | 11/1976 | Werner et al. | 264/36 |
| 4,032,272 | 6/1977 | Miller | 425/405.1 |
| 4,249,869 | 2/1981 | Petersen | 425/13 |
| 4,280,861 | 7/1981 | Schwartz | 425/13 |
| 4,385,879 | 5/1983 | Wilkinson | 425/12 |
| 4,419,305 | 12/1983 | Matles | 156/382 |
| 4,569,808 | 2/1986 | Smali | 156/94 |
| 4,597,727 | 7/1986 | Birkhauser, III | 425/13 |
| 4,681,520 | 7/1987 | Birkhauser, III | 156/94 |
| 4,775,305 | 10/1988 | Alexander et al. | 425/13 |
| 4,820,148 | 4/1989 | Anderson | 156/382 |
| 4,826,413 | 5/1989 | Matles | 156/94 |
| 4,919,602 | 4/1990 | Janszen | 425/12 |
| 4,919,603 | 4/1990 | Herold et al. | 156/382 |
| 4,961,883 | 10/1990 | Jacino et al. | 425/13 |
| 4,975,037 | 12/1990 | Freiheit | 156/94 |

Primary Examiner—Jay H. Woo
Assistant Examiner—C. Scott Bushey
Attorney, Agent, or Firm—Malin, Haley, McHale, DiMaggio & Crosby

[57] ABSTRACT

An apparatus for repairing cracks in a windshield is provided. The apparatus includes a mounting bracket having a plurality of arms. Each arm has a suction cup attached to it for securing the mounting bracket to the windshield to be repaired. One suction cup will be removable for attachment at a second location on its corresponding arm. An injector tube will be attached to the mounting bracket and extend through an aperture in the center of the mounting bracket. When it is desired to repair cracks near the periphery of the windshield, the removable suction cup will be attached to its second location and the injector tube will be attached to the suction cups original location.

9 Claims, 3 Drawing Sheets

WINDSHIELD REPAIR APPARATUS

BACKGROUND OF THE INVENTION

1. Field of the Invention

The instant invention relates to an apparatus and a method for repairing cracks in windshields and more particularly to a device for repairing cracks by the injection of resin under air pressure into the crack.

2. Description of Related Art

Many different devices and methods for repairing cracks in a windshield are known in the prior art. Exemplary of such devices and methods are U.S. Pat. Nos. 3,765,975, 3,562,366, and 3,993,520. U.S. Pat. No. 3,562,366 discloses a method for repairing cracks in a windshield using ultrasonic vibrations around the crack to facilitate the filling of the open portion of the crack with the resin. U.S. Pat. No. 3,765,975 discloses a method for repairing cracks in a windshield that includes the use of a probe which mechanically pushes the broken portion of glass away from the crack area to allow resin to flow into the crack. Thereafter, the area is subjected to alternating low and high pressure within a control range to facilitate the correct hardening of the resin.

U.S. Pat. No. 3,993,520 discloses an apparatus and method for repairing windshields that includes positioning a syringe-like injector over the crack to be repaired and creating sealing contact between the syringe injector and the windshield itself. Thereafter resin under pressure is inserted into the crack by a plunger inserted into the syringe injector. Pushing the plunger into the syringe injector puts pressure on the resin thereby forcing it into the crack. Thereafter the plunger is pulled out of the syringe injector to create a vacuum on the resin to remove air bubbles which may be present.

The applicant is aware of no prior art using air pressure to force the resin into the crack to be repaired. Further, the applicant is not aware of any pressure systems which allow cracks in the corners of a windshield to be repaired.

SUMMARY OF THE INVENTION

The present invention relates to an apparatus for repairing windshields which forces resin under air pressure into the crack to be repaired. The pressurized condition of the resin is maintained for a sufficient length of time to allow the resin to move under pressure into the extended areas of the crack. The device which injects the resin into the crack is brought into sealing contact with the windshield at one end. The other end is connected to an air pressure generating device such as a pump which provides the air pressure to force the resin into the crack. The injector is positioned above the crack by means of a mounting bracket with suction cups which secures the injector in position above the crack to be repaired.

Air bubbles are removed from the resin prior to inserting the resin into the crack by creating a vacuum above the resin while it is still in the injector. The vacuum is created by the pump which is connected to the injector containing resin. After the air is removed from the resin through the vacuum process, the pump is adapted to provide air pressure to the resin thereby forcing the resin into the crack.

The resin used may be of any suitable formulation that has substantially the same index refraction as glass. Because the resin has essentially the same index refraction as the glass into which it is inserted, and because of the removal of air bubbles as explained herein, the repaired crack becomes virtually impossible to visually detect, thereby eliminating the annoying and distracting appearance of cracks in windshields.

DETAILED DESCRIPTION OF THE INVENTION

Figure 1:
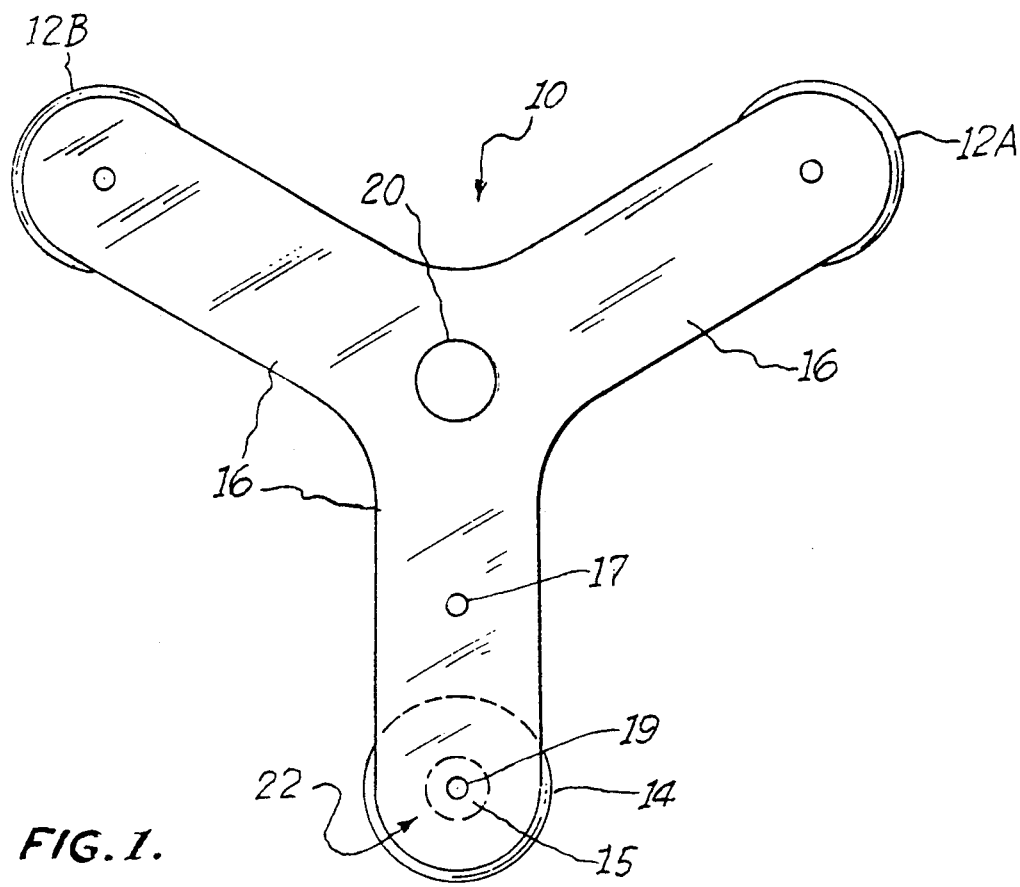
FIG. 1 is a plan view of the mounting bracket and suctions cups of the invention with an injector located in the central aperture.

Referring first to FIG. 1, the mounting bracket 10 is shown with two permanent suction cups 12a, b and a removable suction cup 14. In the preferred embodiment, mounting bracket 10 comprises a three lobe structure with permanent suction cups 12a, b attached at two of the ends of the lobes 16. Removable suction cup 14 is attached at the end of the remaining lobe 16 through adapter 15. The structure and function of adapter 15 and removable suction cup 14 will be described hereafter.

Figure 2:
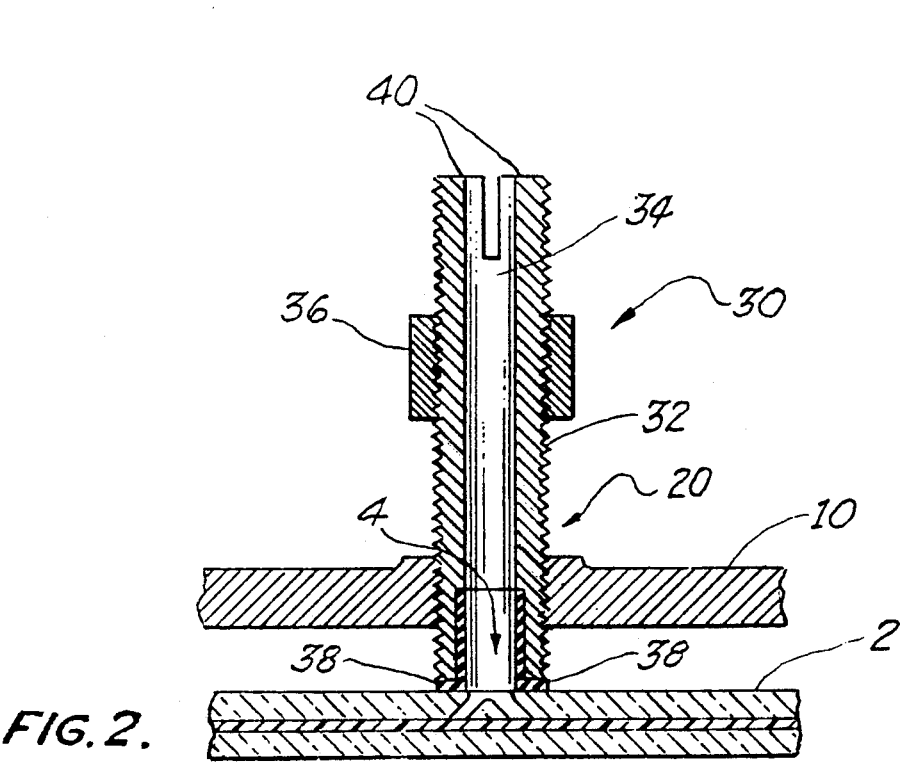
FIG. 2 is a cross sectional view of the pressurized injector in contact with a windshield above a crack to be repaired.
Figure 3:
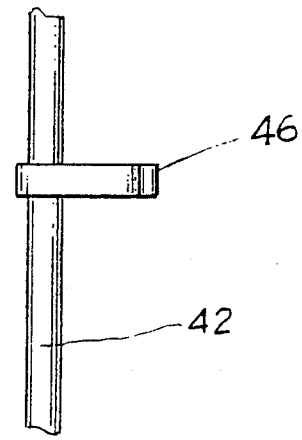
FIG. 3 is a side view of the invention of FIG. 1 in position above a crack on a windshield.
Figure 3:
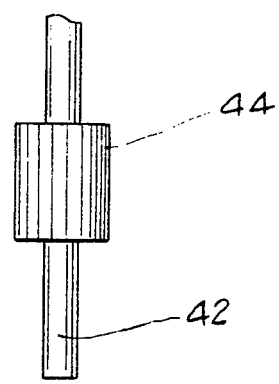
Figure 3:
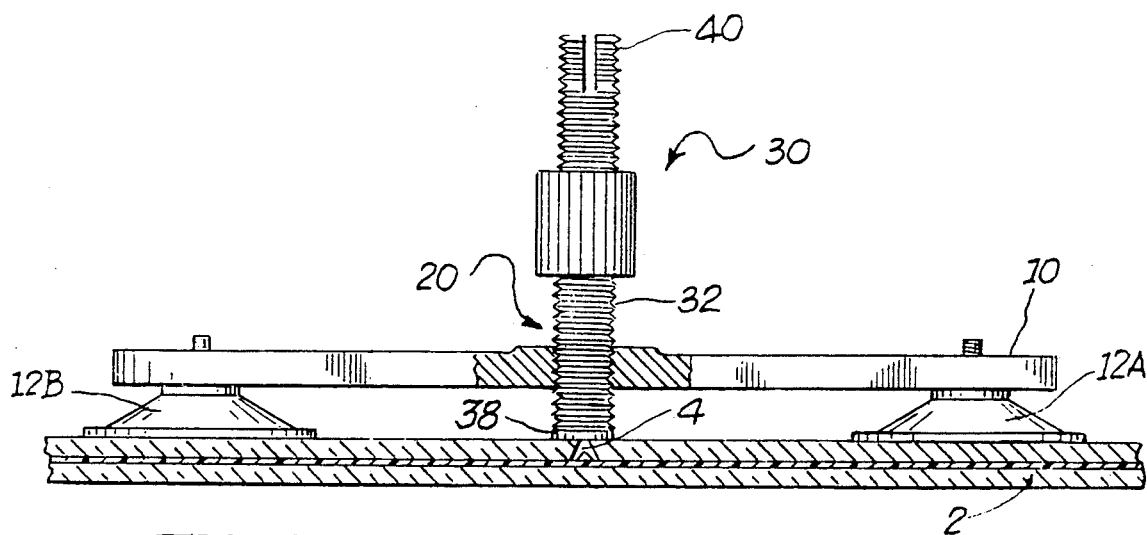

At the confluence of the lobes 16 is a primary pressurized injector aperture 20 which is threaded. As shown in FIG. 3, pressurized injector 30, which has lower threads 32, is threaded into primary pressurized injector aperture 20. Referring to FIG. 2, pressurized injector 30 includes an inner chamber 34 which runs entirely through pressurized injector 30. Pressurized injector 30 also includes a knurled head 36 which allows pressurized injector 30 to be manually threaded into primary pressurized injector aperture 20.

At one end of pressurized injector 30, a hollow rubberized injector seal 38 is sealingly placed within inner chamber 34. Injector seal 38 extends downward from within pressurized injector 30 and flares outward at the lower surface of pressurized injector 30 for a purpose which will be described hereafter. Injector seal 38 forms an airtight seal with inner chamber 34 so that air within inner chamber 34 may leave the lower end of pressurized injector 30 through the end of hollow injector seal 38.

At the opposite end of pressurized injector 30 is compression flange 40 which extends upward from a knurled head 36. Compression flange 40 comprises a series of notched flanges surrounding inner chamber 34. Compression flange 40 is threaded on its outer surface.

Figure 6:
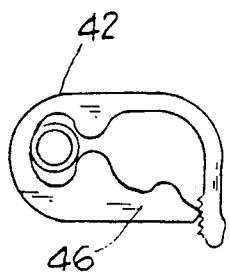
FIG. 6 is a plan cross sectional view of the clamp in place on the tube.

The end of a tube 42 having approximately the same outside diameter as the inside diameter of inner chamber 34 is placed within inner chamber 34 at the compression flange 40. Compression nut 4 is placed over tube 42 and is threaded onto compression flange 40. As the compression nut 44 is threaded onto compression flange 40, the notched flanges of compression flange 40 are pushed together thereby tightly gripping tube 42 and forming an airtight seal. Positioned along tube 42 is a clamp 46 (FIG. 6) which provides an airtight clamp on tube 42. Clamp 46 is movable along tube 42 so that it may be positioned according to the user's preference.

Figure 4:
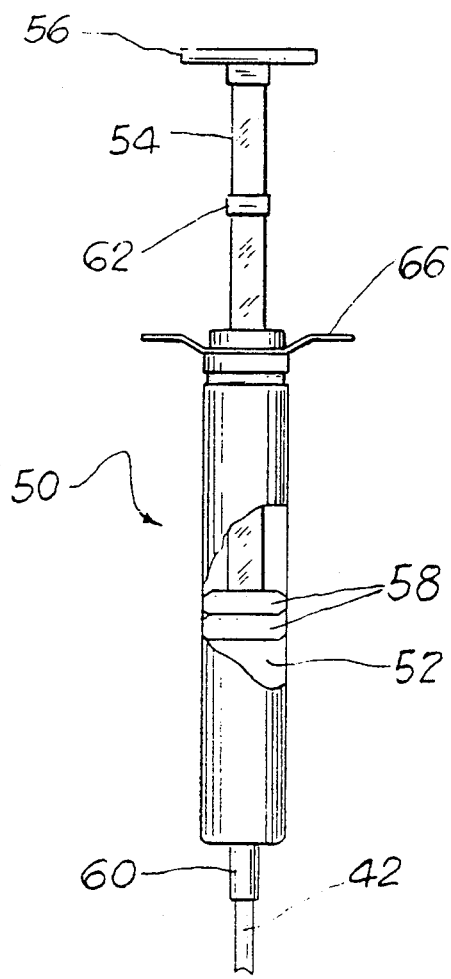
FIG. 4 is a side elevational view of the pump with a cut away view of the chamber.

Tube 42 is attached at its other end to pump 50 through tube connector 60 as shown in FIG. 4. Pump 50 comprises an enclosed chamber 52 into which a plunger 54 is inserted having a plug 58 on its end. Plug 58 forms an airtight seal with the inside surface of chamber 52 and is moved up and down within chamber 52 by the movement of plunger 54. The movement of plunger 54 is facilitated by handle 56. In addition, finger grip 66 is provided so that finger grip 66 may be grasped with the fingers of the hand while handle 56 is placed in the palm of the hand. Plunger 54 ma then be moved into chamber 52 by closing the hand. Conversely, to pull plunger 54 out of chamber 52, finger grip 66 may be grasped with one hand while handle 56 is pulled away from chamber 52 by the other hand of the user.

Figure 5:
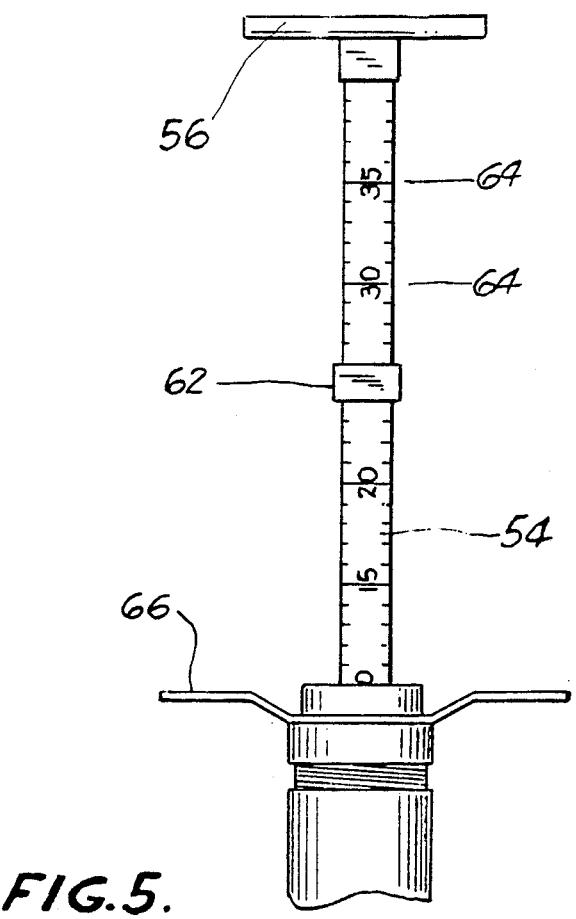
FIG. 5 is a side view of the plunger of the pump of FIG. 4 with the unique numbering scale which allows determination of the correct air pressure to be applied to the resin by the pressurized injector.

Plunger 54 is threaded along its length. A threaded stop nut 62 is threaded along the threads of plunger 54 for a purpose which will be explained hereafter. As can be seen in FIG. 5, plunger 54 has a series of indicia 64 located along its length. The indicia 64 represents volumes of air which are available to be expelled from chamber 52 through tube connector 60 when plunger 54 is inserted into chamber 52 as will be explained hereafter. Although plunger 54 is threaded along its length, it is only in sliding engagement with chamber 52 so that the only function of the threads is to hold stop 62 in position along its length.

Before using the instant invention, it is important that the crack area that will be repaired, including inside the crack 4, is clean and dry and free of water. The cleaning of such cracks may be performed by techniques common in the industry. If drying is necessary, a simple way of drying the area is to place acetone into the crack 4 and around the area. The acetone will quickly mix with any water that is present. Thereafter the acetone and water mixture may be removed by wiping the outside surface of the windshield and then by placing a suction cup over the crack and removing any acetone or water mixture which may be present within the crack itself.

After the area has been prepared by cleaning and drying it, the mounting bracket 10 and pressurized injector 30 may be placed above the crack 4 that is to be repaired. This is done by centering the pressurized injectors 30, which is located within the primary pressurized injection aperture 20, on mounting bracket 10 above the crack 4 to be repaired. Thereafter, mounting bracket 10 is pressed downward thereby fixing permanent suction cups 12a, b and removable suction cup 14 in contact with the windshield 2. Knurled head 36 on pressurized injector 30 is then manually rotated so that pressurized injector 30 is moved downward in primary pressurized injector aperture 20. Pressurized injector 30 will make contact with the windshield 2 at the outwardly flared end of injector seal 38. Thereafter pressurized injector 30 is threaded downward in primary pressurized injector aperture 20 so that a strong airtight seal is formed between injector seal 38 and the windshield 2.

A small amount of resin, typically about 1 cc is placed within inner chamber 34. Tube 42 is then attached to compression flange 40 at one end and tube connector 60 at its other end thereby connecting pressurized injector 30 with pump 50. Prior to making the airtight connection between tube 42 and tube connector 60, plunger 54 is pressed into chamber 52 as far as it will go. After tube 42 has been sealingly connected along its length, plunger 54 is pulled away from chamber 52 thereby creating a vacuum. Once the vacuum has been formed, clamp 46 is placed on tube 42 to preserve the vacuum. Tube 42 is removed from tube connector 60 and plunger 54 is depressed into chamber 52. Tube 42 is reattached to tube connector 60 in an airtight sealing configuration. After the airtight connection has been made, clamp 46 is released and plunger 54 is pulled away from chamber 52 thereby increasing the vacuum within tube 54 and on the resin. This process is repeated four or five times to increase the vacuum applied to the resin. The application of this vacuum to the resin causes any air bubbles present in the resin to expand and move out of the resin into tube 42 thereby removing air from the resin.

After the air has been removed from the resin, tube 42 is released from tube connector 60 thereby breaking the vacuum.

Handle 56 is then pulled entirely away from chamber 52 and tube 42 is then connected in airtight connection with tube connector 60. Stop 62 is rotated along plunger 54 by its threading engagement plunger 54 to a specific position indicated by the indicia 64 along plunger 54. The location of the indicia 64 are chosen to represent the pressure of air created within tube 42 upon depressing plunger 54 that is necessary to push the resin into the crack 4 as determined by the type of crack. After the stop 62 has been placed in an appropriate location along plunger 54 as indicated by indicia 64, handle 56 is depressed forcing plunger 54 into chamber 52. Moving plunger 54 into chamber 52 moves airtight plug 58 along chamber 52 thereby creating air pressure within tube 42. This air pressure is transferred to inner chamber 34 and by extension to the resin. Handle 56 is pressed into chamber 52 until its motion is halted by the interaction of stop 62 with the top of chamber 52. Thereafter, clamp 46 is placed on tube 42 thereby sealing the air under pressure within tube 42. Pump 50 may then be removed from its connection with tube 42 at tube connector 60 without disturbing the air pressure acting on the resin.

Because air within tube 42 is under pressure, the resin will be forced into the crack 4. Clamp 46 is kept in position on tube 42 for about 15 minutes to allow the resin under pressure from the air to move into the furthest reaches of the crack 4. After the resin has had a chance to remain in crack 4 for about 15 minutes, clamp 46 is removed from tube 42 thereby releasing the air pressure accummulated within tube 42. The mounting bracket 10 with its suction cups 12a, b and 14 as well as pressurized injector 30 are then removed from the surface of the windshield 2. Thereafter the resin is allowed to cure.

The description of the structure and the operation of the instant invention has been described in connection with placing the pressurized injector 30 in the primary pressurized injector 20 which is located at the confluence of the lobes 16 of the mounting bracket 10. The instant invention provides an alternate mounting position for pressurized injector 30 that allows cracks 4 in the corners of windshields 2 to be repaired.

When it is desired to fix cracks in the corner of a windshield where it would be difficult or impossible to mount mounting bracket 10 by placing suction cups 12a, b and 14 in contact with the windshield, removable suction cup 14 may be moved to a new position. Pressurized injector 30 is also moved to a new position at the end of the lobe 16 where removable suction cup 14 had previously been placed. Then, mounting bracket 10 is attached to the windshield and pressurized injector 30 is placed in contact with the crack in the corner.

As mentioned, removable suction cup 14 is removable from its position in lobe 16. Adapter 15, has external threads and a threaded internal bore 19 which receives the threads on removable suction cup 14. The external threads on adapter 15 interact with a secondary pressurized injector aperture 22 at the end of lobe 16 to securely hold adapter 15 in place. When removable suction cup 14 is threaded into the internal bore 19 of adapter 15, removable suction cup 14 is also held in place. The diameter and threads of secondary pressurized injector aperture 22 are identical to primary pressurized injector aperture 20.

To use mounting bracket 10 in its configuration to repair cracks in the corners of windshields, the adapter 15 is removed from secondary pressurized injector aperture 22. Thereafter, removable suction cup 14 is removed from adapter 15. Pressurized injector 30 is threaded into secondary pressurized injector aperture 22. Suction cup 14 is then threaded into secondary mounting aperture 17 located along lobe 16 so that removable suction cup 14, when threaded into secondary aperture 17, will not contact pressurized injector 30 when it is threaded into secondary pressurized injector aperture 22.

Once pressurized injector 30 has been positioned above the crack in this configuration, the operation of the invention is identical to that which has been explained previously. In this way, cracks 4 in the corner of the windshield 2 are able to be repaired by the instant invention in a way which has been previously unavailable by the prior art devices.

Having thus described the instant invention in connection with the specific embodiment, it is recognized that the embodiment given is given merely by means of example and not by way of limitation. Changes and modifications may be made to the description given and still be within the scope of the invention. Further, obvious changes and modifications will occur to one skilled in the art.

What I claim is:

1. An apparatus for injecting a liquid repair material into a crack of a glass windshield, comprising:
   (a) an injector tube having an airtight internal chamber and a lower opening;
   (b) means for positioning said injector tube above a crack to be repaired, wherein said means for positioning includes a mounting bracket having a plurality of suction cups extending therefrom, said injector tube removably attached to said mounting bracket at a first location, whereby said suction cups are placed in contact with said windshield to position said mounting bracket and said injector tube above said crack on said windshield;
   (c) means for creating an airtight seal between said lower opening of said injector tube and said windshield, said seal means including a rubber gasket extending from said chamber outward across said lower opening of said injector tube;
   (d) means for applying air pressure to said chamber whereby a sealing material is forced out of said chamber through said lower opening, said means for applying air pressure including an air pump connected to said chamber by a tube, said air pump capable of applying a gauged pressure, said means for applying air pressure being removable from, and independent of, said mounting bracket, said mounting bracket, injector tube and rubber gasket capable of remaining in place and including means for maintaining said applied air pressure and thereby functioning to repair said glass subsequent to removal of said means for applying air pressure;
   (e) means for applying a vacuum to said chamber, whereby air within said resin is removed from said resin; and
   (f) means for moving said injector tube from said first location to a second location on said mounting bracket, said injector tube being removably interchangeable with at least one said suction cup allowing said apparatus to repair a crack anywhere about the periphery of said windshield.

2. The apparatus of claim 1 wherein said means for providing a vacuum comprises a pump connected to said chamber by a tube.

3. The apparatus of claim 1 wherein said mounting structure has a plurality of lobes extending radially away from a centrally located first aperture, said first aperture for positioning said injector tube, said lobes for attaching said suction cups.

4. The apparatus of claim 3 further comprising a second aperture for receiving said injector tube, said second aperture located along one of said lobes away from said first aperture.

5. The apparatus of claim 4 further comprising a means for positioning a suction cup intermediate said first and said second apertures.

6. The apparatus of claim 1 wherein said pump comprises:
   (a) a pump chamber;
   (b) a plunger extending into said pump chamber; and,
   (c) an airtight plug attached to an end of said plunger within said pump chamber whereby said plug forms an airtight seal with said pump chamber whereby movement of said plunger into said pump chamber causes said plug to move within said pump chamber creating compression of air within said pump chamber.

7. The apparatus of claim 2 wherein said pump comprises:
   (a) a pump chamber;
   (b) a plunger extending into said pump chamber; and,
   (c) an airtight plug attached to an end of said plunger within said pump chamber whereby movement of said plunger out of said pump chamber causes said plug to move within said pump chamber creating a vacuum within said pump chamber.

8. The apparatus of claim 6 wherein said plunger has a stop selectively attached along a length of said plunger, said stop for restraining the movement of said plunger into said pump chamber.

9. The apparatus of claim 8 further comprising indicia, located along said plunger, for indicating where said stop should be placed along said plunger.

* * * * *